United States Patent
Marascu et al.

(10) Patent No.: US 11,410,184 B2
(45) Date of Patent: *Aug. 9, 2022

(54) EXTRACTION OF COMPLIANCE NAMED ENTITIES OF TYPE ORGANIZATION

(71) Applicant: INTERNATIONAL BUSINESS MACHINES CORPORATION, Armonk, NY (US)

(72) Inventors: Alice-Maria Marascu, Dublin (IE); Rahul Nair, Dublin (IE); Marc H. Coq, Hopewell Junction, NY (US); Sandra C. Thompson, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/953,741

(22) Filed: Apr. 16, 2018

(65) Prior Publication Data
US 2019/0318363 A1    Oct. 17, 2019

(51) Int. Cl.
*G06Q 30/00* (2012.01)
*G06N 20/00* (2019.01)
*G06F 40/40* (2020.01)

(52) U.S. Cl.
CPC .......... *G06Q 30/018* (2013.01); *G06F 40/40* (2020.01); *G06N 20/00* (2019.01)

(58) Field of Classification Search
CPC ..... G06Q 30/018; G06F 40/295; G06N 20/00
See application file for complete search history.

(56) References Cited

U.S. PATENT DOCUMENTS

| | | | |
|---|---|---|---|
| 7,603,358 B1 | 10/2009 | Anderson et al. | |
| 7,937,319 B2 | 5/2011 | Kennis et al. | |
| 8,694,347 B2 | 4/2014 | Kennis et al. | |
| 9,058,606 B1* | 6/2015 | Tulek | G06Q 30/018 |
| 9,123,024 B2 | 9/2015 | Levine et al. | |
| 9,292,623 B2 | 3/2016 | Walker | |
| 9,355,255 B1 | 5/2016 | King et al. | |
| 2004/0107124 A1 | 6/2004 | Sharpe et al. | |
| 2006/0212486 A1* | 9/2006 | Kennis | G06Q 40/04 |
| 2009/0177664 A9 | 7/2009 | Hotchkiss et al. | |

(Continued)

FOREIGN PATENT DOCUMENTS

WO    2016070271 A1    5/2016

OTHER PUBLICATIONS

M. El Kharbili, Q. Ma, P. Kelsen and E. Pulvermueller, "CoReL: Policy-Based and Model-Driven Regulatory Compliance Management," 2011 IEEE 15th International Enterprise Distributed Object Computing Conference, 2011, pp. 247-256, doi: 10.1109/EDOC.2011.23 (Year: 2011).*

(Continued)

*Primary Examiner* — Carrie S Gilkey
(74) *Attorney, Agent, or Firm* — Griffiths & Seaton PLLC

(57) ABSTRACT

Embodiments for automatic extraction of data of a compliance named entity of type organization by a processor. One or more segments of text data may be extracted from one or more data sources representing one or more objects describing a compliance named entity of type organization expected to conform to an obligation, a law, policy, regulation, or a combination thereof.

20 Claims, 17 Drawing Sheets

(56) References Cited

U.S. PATENT DOCUMENTS

| | | | | |
|---|---|---|---|---|
| 2013/0311467 | A1* | 11/2013 | Galle | G06F 40/247 |
| | | | | 707/737 |
| 2016/0078363 | A1* | 3/2016 | Hodel | G05B 13/0265 |
| | | | | 706/12 |
| 2016/0188541 | A1* | 6/2016 | Chulinin | G06F 40/129 |
| | | | | 704/8 |
| 2016/0350766 | A1* | 12/2016 | Clark | G06Q 30/0609 |
| 2016/0371618 | A1 | 12/2016 | Leidner et al. | |
| 2017/0236129 | A1 | 8/2017 | Kholkar et al. | |
| 2019/0318363 | A1 | 10/2019 | Marascu et al. | |

OTHER PUBLICATIONS

List of IBM Patents or Patent Applications Treated as Related dated Apr. 17, 2018 (2 pages).

Kiyavitskaya et al., "Extracting Rights and Obligations from Regulations: Toward a Tool-Supported Process," Proceedings of the 22nd IEEE/ACM International Conference on Automated Software Engineering, 2007 (4 pages).

Sapkota et al., "Extracting Meaningful Entities from Regulatory Text: Towards Automating Regulatory Compliance," 2012 IEEE Fifth International Workshop on Requirements Engineering and Law (RELAW), 2012 (4 pages).

Kiyavitskaya et al., "Automating the Extraction of Rights and Obligations for Regulatory Compliance," Retrieved from Internet using: http://www.cs.cmu.edu/~./breaux/publications/nkiyavitskaya-er08.pdf, 2008 (14 pages).

Breaux et al., "Towards Regulatory Compliance: Extracting Rights and Obligations to Align Requirements with Regulations," 14th IEEE International Requirements Engineering Conference (RE'06), 2006 (10 pages).

Breaux et al., "Mining Rule Semantics to Understand Legislative Compliance," In Proceedings of the 2005 ACM Workshop on Privacy in the Electronic Society (WPE '05), ACM, 2005 (4 pages).

Kharbili et al., "Enterprise Regulatory Compliance Modeling using CoReL: An Illustrative Example," 2011 IEEE Conference on Commerce and Enterprise Computing, 2011 (6 pages).

Sadiq et al., "Managing Regulatory Compliance in Business Processes," Handbook on Business Process Management 2, International Handbooks on Information Systems, 2015 (23 pages).

Sapkota et al., "Towards Semantic Methodologies for Automatic Regulatory Compliance Support," In Proceedings of the 4th Workshop for Ph.D Students in Information and Knowledge Management (PIKM '11), ACM, 2011 (4 pages).

Ghanavati, "A compliance framework for business processes based on URN," University of Ottawa, 2007 (140 pages).

Schumm et al., "Integrating Compliance into Business Processes: Process Fragments as Reusable Compliance Controls," MKWI 2010—Proceedings of the Multikonferenz Wirtschaftsinformatik, Feb. 23-25, 2010 (13 pages).

Kharbili, "Business Process Regulatory Compliance Management Solution Frameworks: A Comparative Evaluation," Proceedings of the Eighth Asia-Pacific Conference on Conceptual Modelling (APCCM), 2012 (10 pages).

"Regulatory Compliance," PTC, http://support.ptc.com/WCMS/files/45036/en/RC-2082_v2.pdf, 2007 (4 pages).

* cited by examiner

TABLE 2: PATTERNS FOR OBLIGATIONS

| ID | PATTERN |
|---|---|
| O_1 | <ACTOR> SHOULD <VERB>... |
| O_2 | <ACTOR> SHOULD BE <VERB'ED>... |
| O_3 | <ACTOR> WILL/WOULD <VERB>... |
| O_4 | <ACTOR> MUST/MUST BE <VERB'ED>... |
| O_5 | <ACTOR> WHICH IS CHARGED WITH <VERB'ING> |
| O_6 | <POLICY> REQUIRES <ACTOR> TO <VERB>... |
| O_7 | <ACTOR> MAY NOT <VERB>... |

TABLE 3: PATTERNS FOR CONSTRAINTS

| ID | PATTERN |
|---|---|
| C_1 | <ACTOR> SHOULD BE ABLE TO <VERB>... IF <ACTOR/OBJECT>...<VERB> |
| C_2 | <ACTOR> MAY <VERB>... BUT <ACTOR> WOULD NOT HAVE TO <VERB>... |
| C_3 | <ACTOR> WILL <VERB>... ON/UPON <EVENT>... |
| C_4 | <ACTOR> MAY <VERB>... FOR/FOR EACH <EVENT>... |
| C_5 | <ACTOR> MUST <VERB>... TO ENSURE THAT <ACTOR>... WILL <VERB>... |
| C_6 | <ACTOR> WOULD HAVE TO <VERB>... BEFORE <VERB>... |
| C_7 | <ACTOR> MUST FIRST <VERB>... BEFORE <VERB>... |
| C_8 | <ACTOR> MUST <VERB>... BY <DATE>... |
| C_9 | <ACTOR> SHOULD <VERB>... WITHIN <TIMEFRAME>... |

REFERENCE [1-2]

FIG. 5C

EXAMPLE OF RULES THAT CAN BE USED (NON-EXHAUSTIVE LIST)

RECYCLER    ORGANIZATION
(PRODUCER | MANUFACTURER | DISTRUBUTOR | COLLECTOR | RECYCLER)    COMPLIANCE_ENTITY
(FORBID | FORBIDDEN)    OBLIGATION_PROHIBITION
(MUST | SHOULD)    OBLIGATION
(WILL | WOULD)    OBLIGATION
MUST BE OBLIGATION
(REQUIRE | REQUIRES)    OBLIGATION
HAVE TO OBLIGATION
HAS TO OBLIGATION
SHOULD BE    OBLIGATION
MAY NOT OBLIGATION
(LICENSING | LICENSE)    OBLIGATION
(PERMIT | PERMITS | PERMITTING)    OBLIGATION
(OBTAIN | OBTAINED | OBTAINING)    OBLIGATION
([A-Z][^\S]+)+([A-Z][^\S]+)    ORGANIZATION_3CAPITALS
([A-Z][^\S]+)+([A-Z][^\S]+)    OBLIGATION_2CAPITALS
SHOULD BE ABLE TO    OBLIGATION_CONSTRAINT
MAY    OBLIGATION_CONSTRAINT
WOULD HAVE TO    OBLIGATION_CONSTRAINT
(CAN | ALLOWED | COULD | PERMITTED | PERMIT | DENY | EXEMPT)    OBLIGATION_RIGHT
IS A    DEFINITION

EXTRACTION OF COMPLIANCE NAMED ENTITIES OF TYPE ORGANIZATION

CROSS-REFERENCE TO RELATED APPLICATIONS

This Application is related to the following Applications having U.S. Ser. Nos. 15/953,731 and 15/953,747, each filed on even date as the present Application.

BACKGROUND OF THE INVENTION

Field of the Invention

The present invention relates in general to computing systems, and more particularly to, various embodiments for extraction of compliance named entities of type organization using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entity's survival and adaptability in a highly competitive environment. Also, many businesses and organizations, such as financial institutions, employing the use of computing systems and online data must ensure operations, practices, and/or procedures are in compliance with general business protocols, corporate compliance, and/or legal regulations, policies, or requirements.

SUMMARY OF THE INVENTION

Various embodiments for automatic extraction of data of a compliance named entity of type organization by a processor are provided. In one embodiment, by way of example only, a method for automatic extraction of data of a compliance named entity of type organization, again by a processor, is provided. One or more segments of text data from one or more data sources representing one or more objects describing a compliance named entity of type organization expected to perform an obligation may be extracted.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5B-5D is a flow diagram depicting extraction of sentences with obligation-like content according to an operation for automatic extraction of data of a compliance named entity of type organization in FIG. 5A in accordance with aspects of the present invention;

DETAILED DESCRIPTION OF THE DRAWINGS

Figure 1:
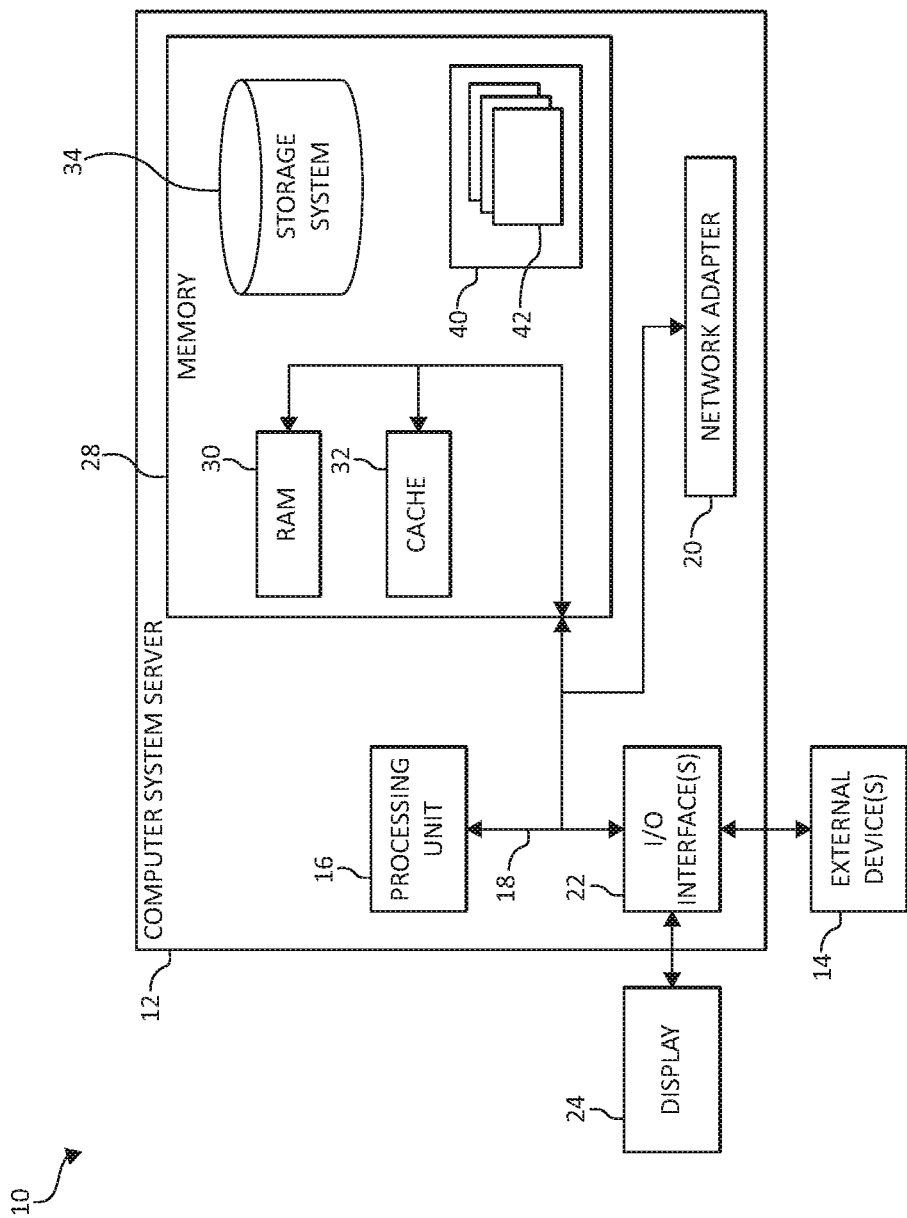
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of topics ranging from scientific, legal, educational, financial, travel, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, entities (e.g., businesses, governments, organizations, academic institutions, etc.) may be subject to certain processes, policies, guidelines, rules, laws, and/or regulations relevant to the entities. Compliance with these processes, policies, guidelines, rules, laws, and/or regulations is critical and essential to ensure integrity of the company while also avoiding violations, fines, or legal punishment. For example, regulatory compliance management is a supreme matter of paramount importance to organizations as new regulations emerge on an on-going basis. These enterprises often require human interaction with various skills and expertise (e.g., a subject matter expert (SME)) to support compliance across the enterprise. Thus, given the vast amount of text data and the pace at which regulation documents change, various embodiments are provided herein to automatically identify and extract compliance representative entities and the processes, policies, guidelines, rules, laws, and/or regulations that apply to each specific type of organization.

As such, there is a need to accurately and automatically extract compliance named entities. In one aspect, a named entity of type organization may be extracted using one or more natural language processing (NLP) named-entity recognition (NER) operations. A NER operation may be a subtask of information extraction that may locate and classify named entities in text into pre-defined categories such as, for example, persons, entities, organizations, and locations. A set of sentences with an obligation-like content may be determined (e.g., computed) using the extraction operation and one or more filtering operations applied to the content of semantic roles from the sentences. A set of compliance named entities of type organization may be determined (e.g., computed). A set of features describing the domains of activity, type, and location from the extended text surrounding the entity text may be extracted. A machine learning (ML) classifier may be trained using one or more of the set features.

In one aspect, the present invention provides a solution for automatic extraction of data of a compliance named entity of type organization. One or more segments of text data may be extracted from one or more data sources representing one or more objects describing a compliance named entity of type organization expected to perform an obligation. The compliance named entity of type organization may be composed of a named entity or agent and one or more features. For example, the named entity identifies an organization, an entity for which one or many rigid designators stands for the referent, or an agent that implies the organization by referring to a group of organizations that are conducting a similar type of activity. The features may include domains of activity, type, keywords, location, date, concepts, categories, and the like. For example, a named entity may be "corporation X," features may be a domain (e.g., import), type (e.g., technology and computing), and location (e.g., City A in Country B). An agent (e.g., a manufacturer or importer) may refer to a group of organizations that are conducting similar or selected activities.

In one aspect, as used herein, the term regulation may be a document written in natural language containing a set of guidelines specifying constraints and preferences pertaining to the desired structure and behavior of an enterprise. A regulation may specify the domain elements it applies to. For example, regulations may be a law (e.g., a health care law, environmental protection laws, aviation laws, etc.), a standardization document, a contract, and the like. A regulation guideline specifies the expected behavior and structure on enterprise domain elements. The regulation guideline additionally defines tolerated and non-tolerated deviations from an ideal (e.g., defined or standardized) behavior and structure, and also defines one or more exceptional cases or situations. A regulation may also specify how the enterprise ought to or may react to deviations from the ideal behavior and structure. It should be noted that in the law domain, regulatory guidelines may be referred to as "norms". A compliance requirement (CR) is a piece of text extracted from a regulation that specifies a given regulatory guideline. The CR may refer to or be related to (e.g., through exception relations) other CRs. CRs must be interpreted by regulation and business experts in order to be transformed into a form that makes them understandable to and enforceable on the enterprise. This process is called concretization (or contextualization or internalization of CRs). A CR is interpreted and expressed in a form that allows relating the CR explicitly to an enterprise model (e.g., business process model). Regulatory Compliance Management (RCM) ensures that enterprises (data, processes, organizations, etc.) are structured and behave in accordance with the regulations that apply, i.e., with the guidelines specified in the regulations or a company is violating a regulation. RCM is composed of compliance modeling, checking, analysis and enactment. Compliance Modeling may be the task of (accurate) formal representation of CRs in the context of a given enterprise. Compliance Modeling is a foremost task in RCM and is the formal representation of compliance requirements in a form that makes them machine-interpretable. In the Compliance Modeling task, the input is a structured and refined representation of compliance requirements extracted from the regulation and the extraction may require the intervention of (i) regulatory and (ii) enterprise experts (e.g., business analysts).

Also, the term "domain" is a term intended to have its ordinary meaning. In addition, the term "domain" can include an area of expertise for a system or a collection of material, information, content and/or other resources related to a particular subject or subjects. For example, a domain can refer to a regulatory, legal, policy, governmental, financial, healthcare, advertising, commerce, scientific, industrial, educational, medical, biomedical-specific information, or other area or information defined by a subject matter expert. A domain can refer to information related to any particular subject matter or a combination of selected subjects.

The term "ontology" is also a term intended to have its ordinary meaning. For example, an ontology may include information or content relevant to a domain of interest or content of a particular class or concept. Content can be any searchable information, for example, information distributed over a computer-accessible network, such as the Internet. A concept or topic can generally be classified into any of a number of content concepts or topics which may also include one or more sub-concepts and/or one or more sub-topics. Examples of concepts or topics may include, but are not limited to, regulatory compliance information, policy information, legal information, governmental information, business information, educational information, or any other information group. The ontology can be continuously updated with the information synchronized with the sources, adding information from the sources to the ontology as models, attributes of models, or associations between models within the ontology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
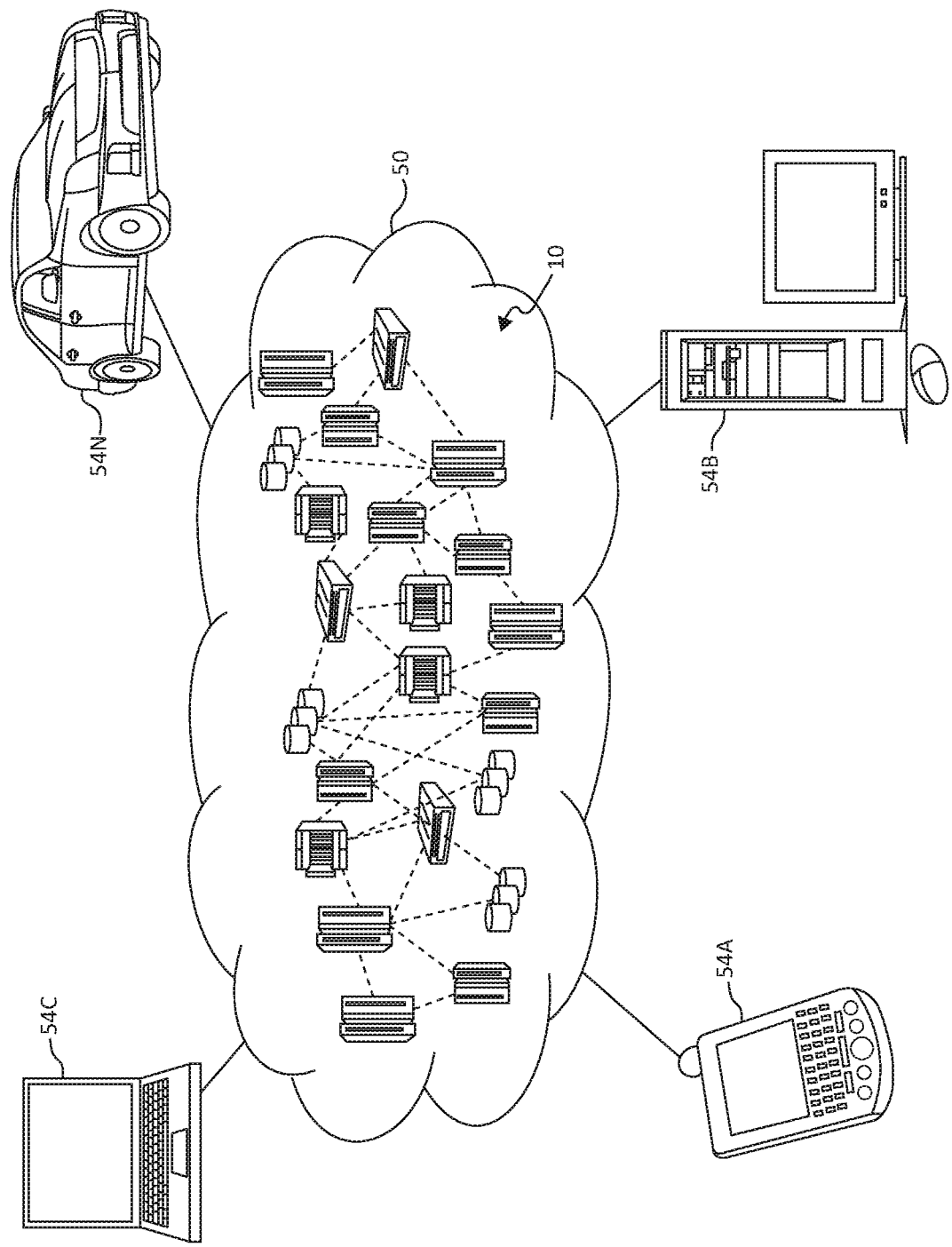
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
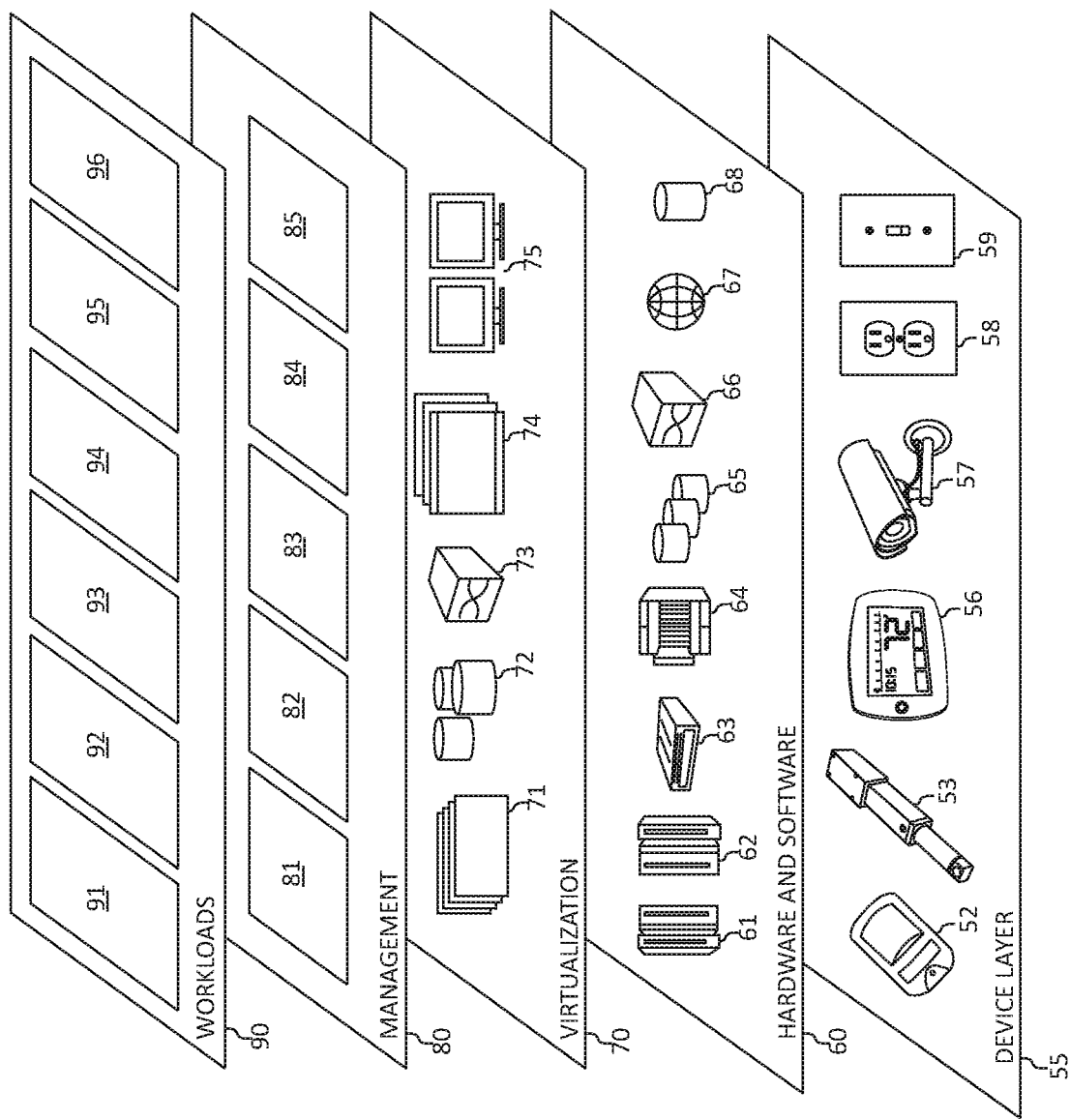
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various extraction of compliance named entities of type organization workloads and functions 96. In addition, extraction of compliance named entities of type organization workloads and functions 96 may include such operations as user profile analytics, user attribute analysis, and as will be further described, user and device management functions. One of ordinary skill in the art will appreciate that the extraction of compliance named entities of type organization workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
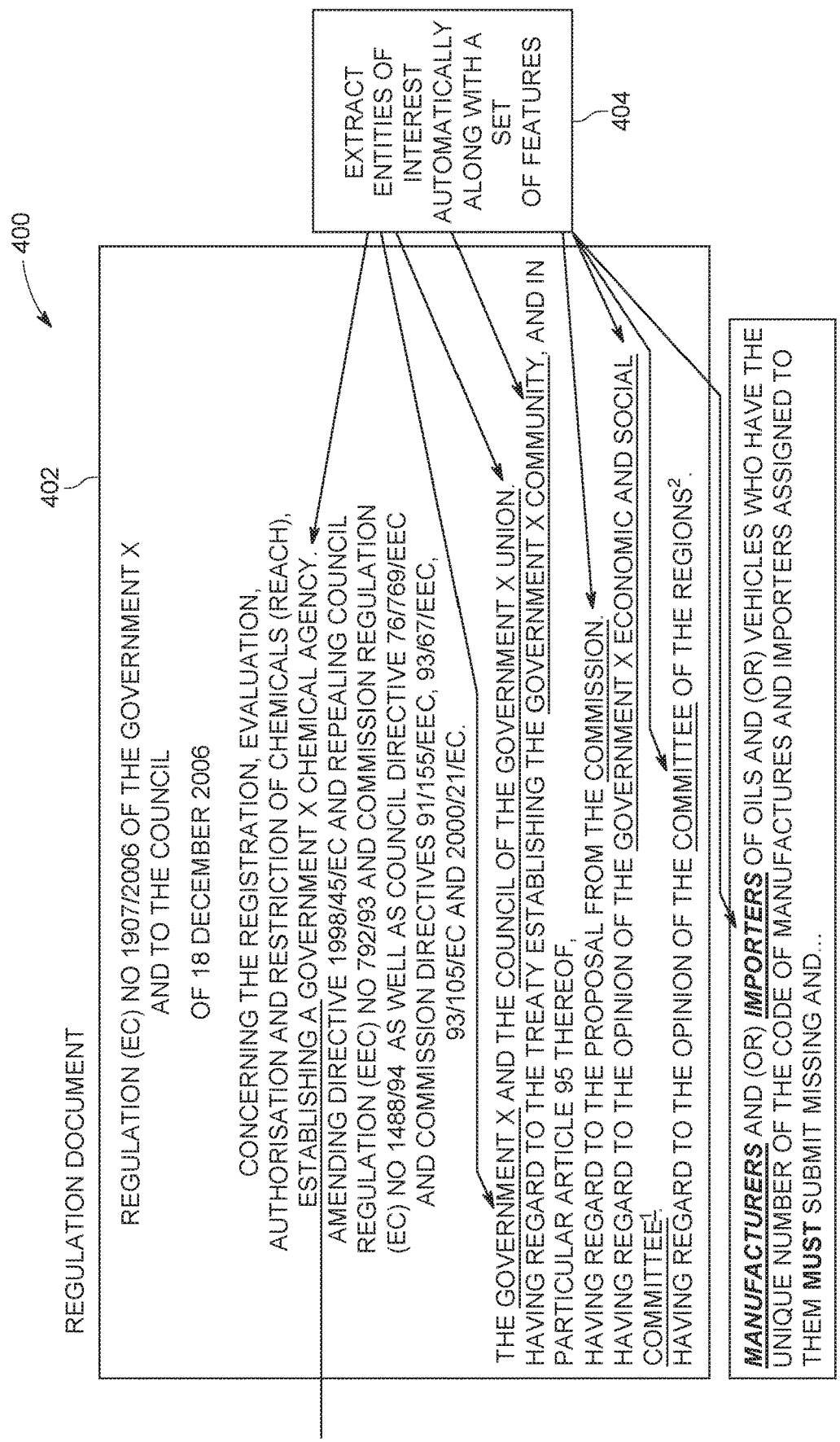
FIG. 4 is an additional diagram depicting automatic extraction of data of a compliance named entity of type organization from a data source in accordance with aspects of the present invention.

Turning now to FIG. 4, a diagram depicting a block/flow diagram for automatic extraction of data of a compliance named entity according to various mechanisms of the illustrated embodiments is shown. For example, a regulation document 402 (from one or more data sources) may be analyzed and text data may be ingested via a compliance named entity extraction component 404. One or more segments of text data along with a set of features representing one or more objects describing a compliance named entity expected to perform an obligation may be extracted from the regulation document 402. Each set of automatically extracted features may be associated with a compliance named entity having an obligation (e.g., a legal, policy, regulatory, or procedural requirement).

Turning now to FIGS. 5A-5K, block/flow diagram 500 is depicting automatic extraction of data of a compliance named entity. More specifically, block diagrams 525, 535, 545, 555, 565, 575, 585, and 595 of FIGS. 5B-5K are a series of operations and components for automatic extraction of data of a compliance named entity according to block diagram 500 in FIG. 5A. In one aspect, one or more of the components, modules, services, applications, and/or functions described in FIGS. 1-4 may be used in FIGS. 5A-5K. For example, computer system/server 12 of FIG. 1, incorporating processing unit 16, may be used to perform various computational, data processing and other functionality in accordance with various aspects of the present invention.

Also, as shown, the various blocks of functionality are depicted with arrows designating the blocks' 500 relationships with each other and to show process flow. As will be seen, many of the functional blocks may also be considered "modules" or "components" of functionality. With the foregoing in mind, the module blocks 500 may also be incorporated into various hardware and software components of a system for automatic extraction of data of a compliance named entity in accordance with the present invention. Many of the functional blocks 500 may execute as background processes on various components, either in distributed computing components, or on the user device, or elsewhere.

In one aspect, at block 502, text data from one or more data sources (e.g., regulatory documents) may be ingested by an ingestion component 502. The ingestion component 502 may ingest text data and detect segment boundary detection (e.g., a sentence boundary detection) using one or more NLP processes.

In one aspect, the text data of one or more data sources may be provided by one or more content contributors. The one or more data sources may be provided as a corpus or group of data sources defined and/or identified. The one or more data sources may include, but are not limited to, data sources relating to one or more documents, regulatory documents, policy documents, legal documents, materials related to regulatory or legal compliance, emails, books, scientific papers, online journals, journals, articles, drafts, and/or other various documents or data sources capable of being published, displayed, interpreted, transcribed, or reduced to text data. The data sources may be all of the same type, for example, pages or articles in a wiki or pages of a blog. Alternatively, the data sources may be of different types, such as word documents, wikis, web pages, power points, printable document format, or any document capable of being analyzed, ingested, used by a natural language processing (NLP) system and/or artificial intelligence (AI) system to provide processed content. For example, the data sources may be processed using a lexical analysis, parsing, extraction of concepts, semantic analysis (e.g., wide-coverage semantic analysis), or a combination thereof and also analyzed by the ingestion component 502 (e.g., using an NLP operation) to data mine or transcribe relevant information from the content of the data sources.

At block 504, an extraction component may extract one or more segments (e.g., sentences) with obligation-like content (e.g., content having direct or inferential semantics that indicate an obligation relating to a law, policy, regulation, or a combination thereof). The extraction of segments (e.g., sentences) may include, but is not limited to, extraction of information through a knowledge generation process that may include initial data collection among different sources, data normalization and aggregation, and final data extraction. Also, the extraction of regulatory, procedural, legal, policy, or other concepts and topics may include, but is not limited to, performing knowledge extraction from natural language text documents including reading input text; transforming the input text into a machine understandable knowledge representation so as to provide knowledge libraries from said documents; and using semantic based means for extracting concepts and their interrelations from said input text. Knowledge structures may be used consisting of regulatory, procedural, legal, policy, or other concepts and topics, such as obligations and violations, and the interrelations of the obligations and violations.

At block 506, an agent mining and filtering operation may be performed on the extracted sentences. In one aspect, from block 502, in parallel or sequentially with blocks 504 and 506, a NER operation may be performed via a NER component at block 510. From block 510, a filtering component may filter the compliance named entities, as in block 512. From blocks 506 and/or 512, a set of compliance named entities (e.g., a final set of compliance named entities) of type organization may be produced (e.g., generated), as in block 508.

Figure 5A:
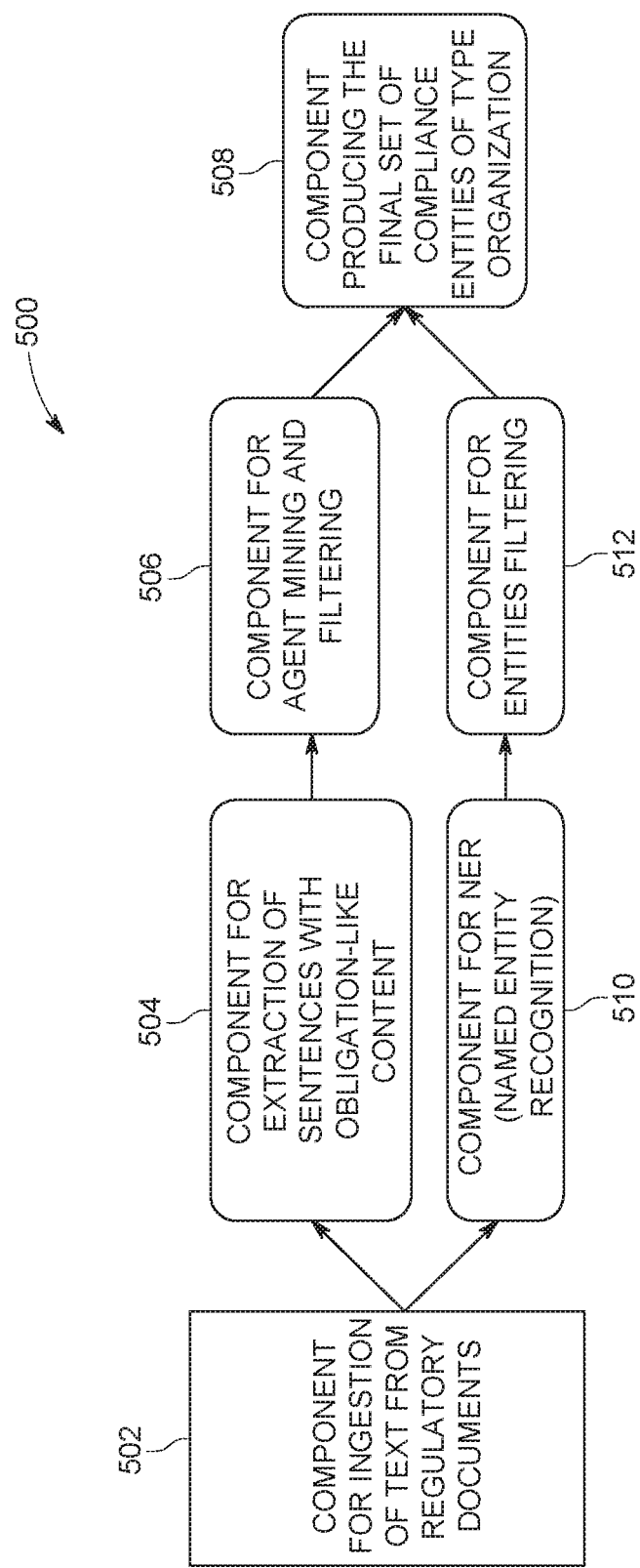
FIG. 5A is a flow diagram depicting automatic extraction of data of a compliance named entity of type organization in accordance with aspects of the present invention.
Figure 5B:
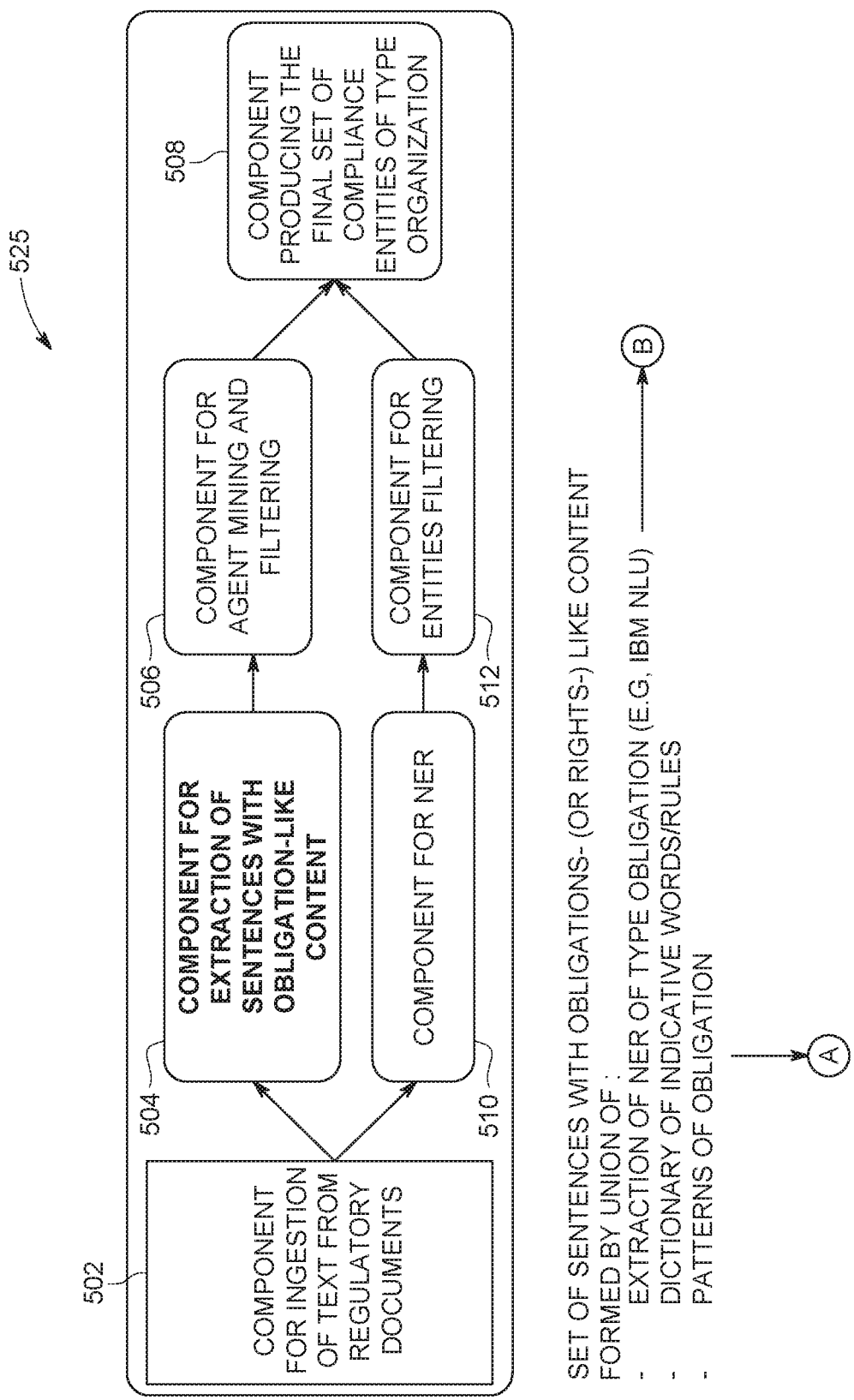

Following, are additional descriptions of automatic extraction of data of a compliance named entity according to FIG. 5A. Turning now to FIG. 5B-D, block diagram 525 depicts extraction of one or more segments (e.g., sentences) with obligation-like content (e.g., content having direct or inferential semantics that indicate an obligation relating to a law, policy, regulation, or a combination thereof), in block 504 of FIG. 5A. In one aspect, a set of sentences with one or more obligations-like content (or rights) may be formed by union of the extraction of NER of type obligation (e.g., IBM® Natural Language Understanding "NLU"), a dictionary of indicative words or rules, and/or patterns of obligation (as shown in Table 2: Patterns for Obligations and/or Table 3: Patterns for Constraints—reference 1-2).

Figure 5E:
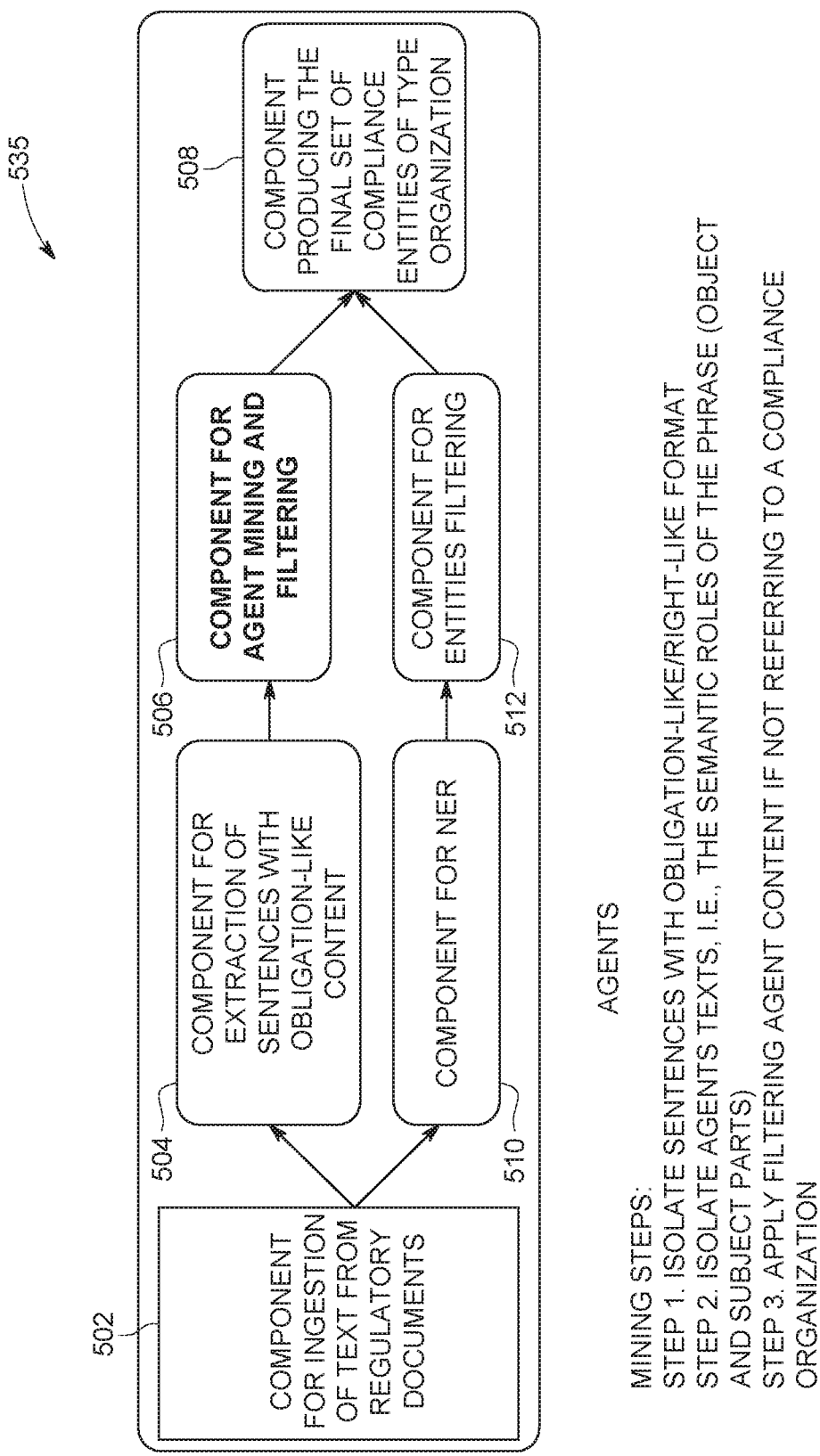
FIG. 5E is a flow diagram depicting agent mining and filtering according to an operation for automatic extraction of data of a compliance named entity of type organization in FIG. 5A in accordance with aspects of the present invention.

Turning now to FIGS. 5E-5H, block diagrams 535, 545, 555, and 565 depict additional operations for agent mining and filtering according to an operation for automatic extraction of data of a compliance named entity as depicted in block 506 of FIG. 5A. As illustrated in FIG. 5E, the agent mining and filtering operation includes steps 1-3.

Figure 5F:
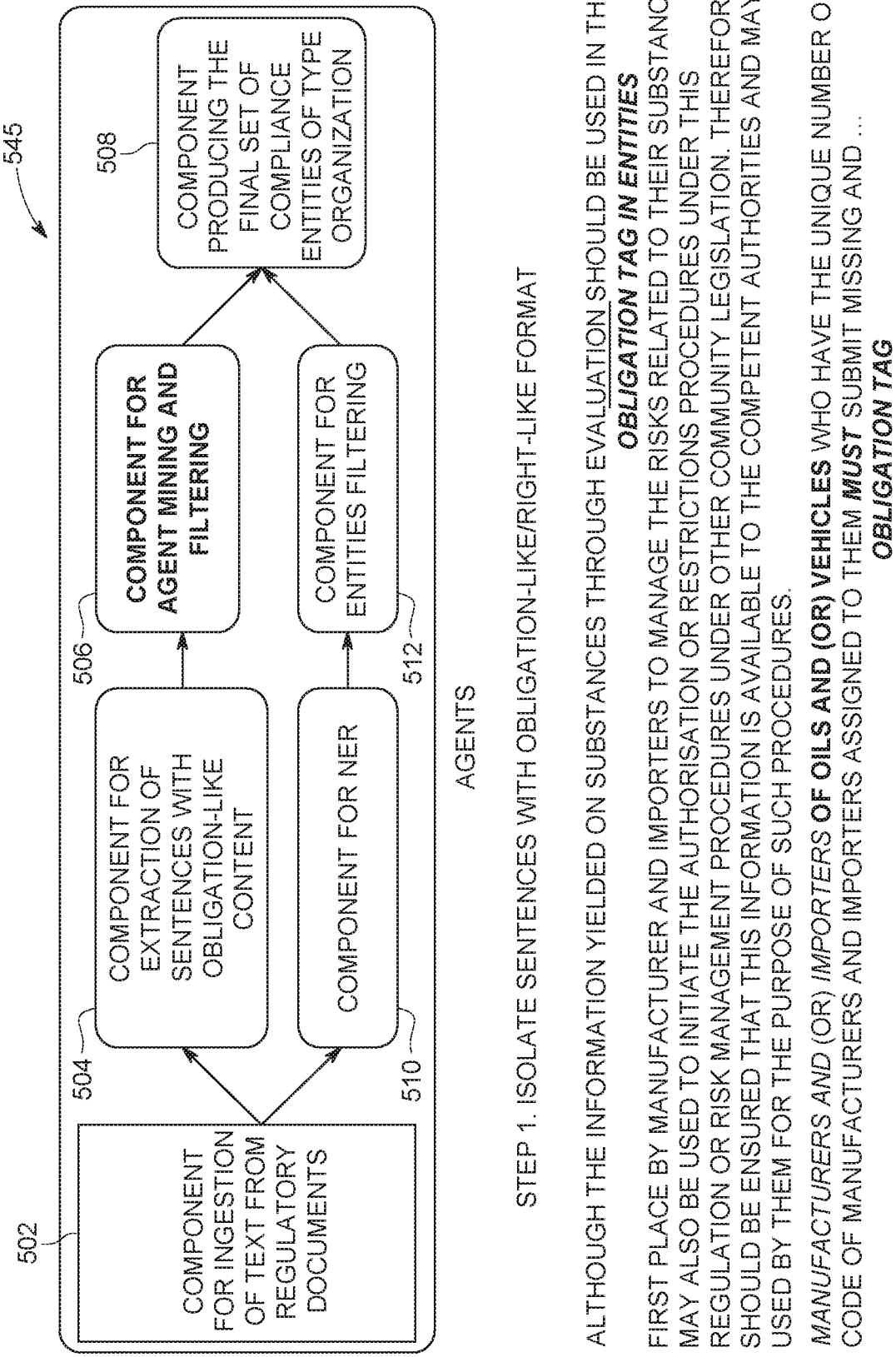
FIG. 5F is an additional flow diagram depicting agent mining and filtering according to an operation for automatic extraction of data of a compliance named entity of type organization in FIG. 5A in accordance with aspects of the present invention.

Step 1 includes isolating sentences with obligation-like or (right-like) format. For example, FIG. 5F illustrates isolating sentences or subparts of sentences of one or more agents (e.g., manufacturers and importers) that are conducting a similar type of activity. Text data such as, for example, "manufacturers," "importers," and "should," may be mined and filtered. An obligation tag may be applied to the text such as, for example, "should" and "must" indicating an obligation, constraint, mandate, recommendation, suggestion, directive, or other action required according to the text.

Figure 5G:
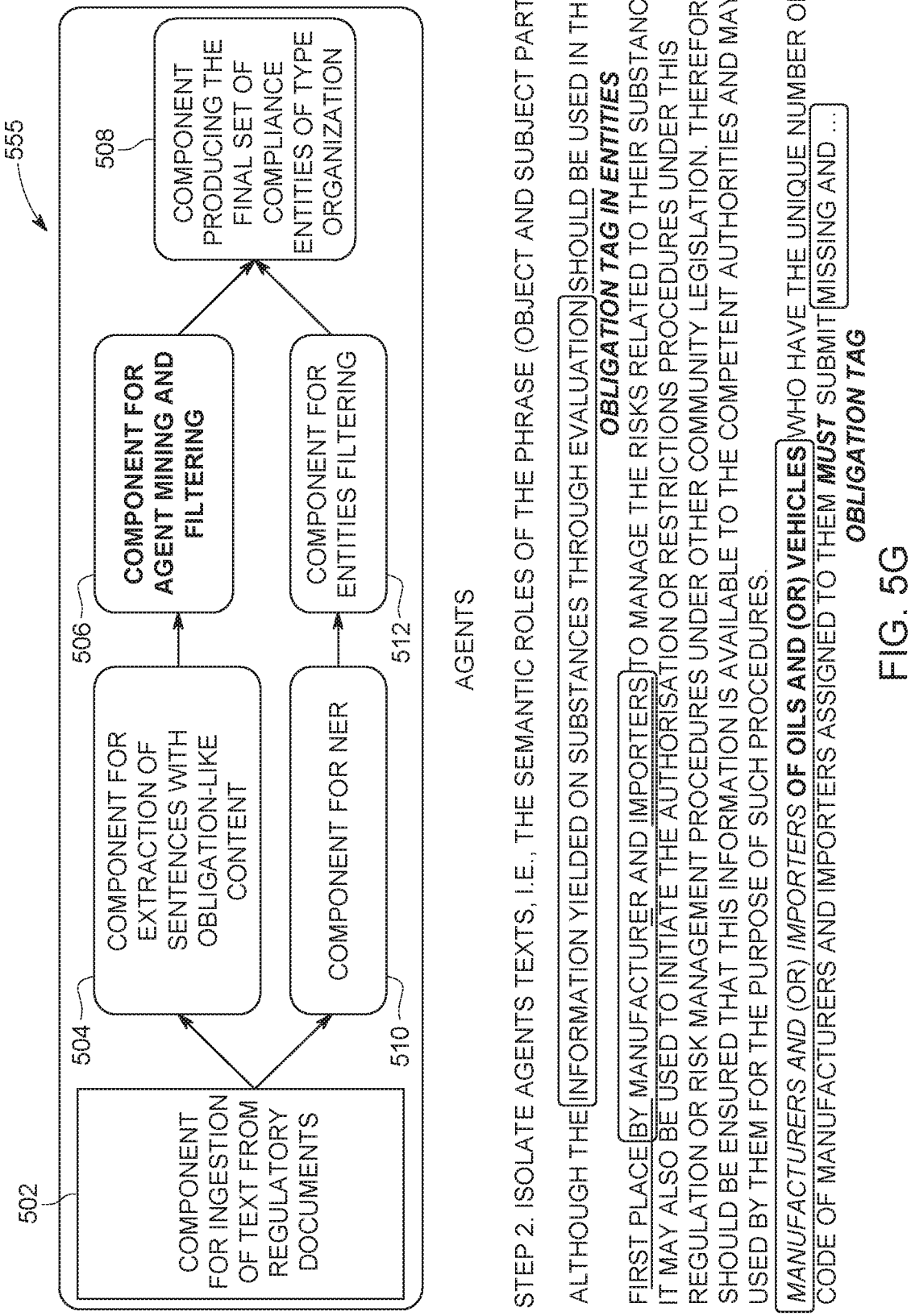
FIG. 5G is an additional flow diagram depicting agent mining and filtering according to an operation for automatic extraction of data of a compliance named entity of type organization in FIG. 5A in accordance with aspects of the present invention.

Step 2 includes the isolating of agent's text (e.g., semantic roles of a phrase, which may include parts of an object and subject of the sentences), as indicated in FIG. 5G. For example, FIG. 5G depicts the agent's text of "information yielded on substances through evaluation," "by manufacturers and importers," "manufacturers and (or) importers of oils and (or) vehicles," and "missing and . . . " have been isolated.

Figure 5H:
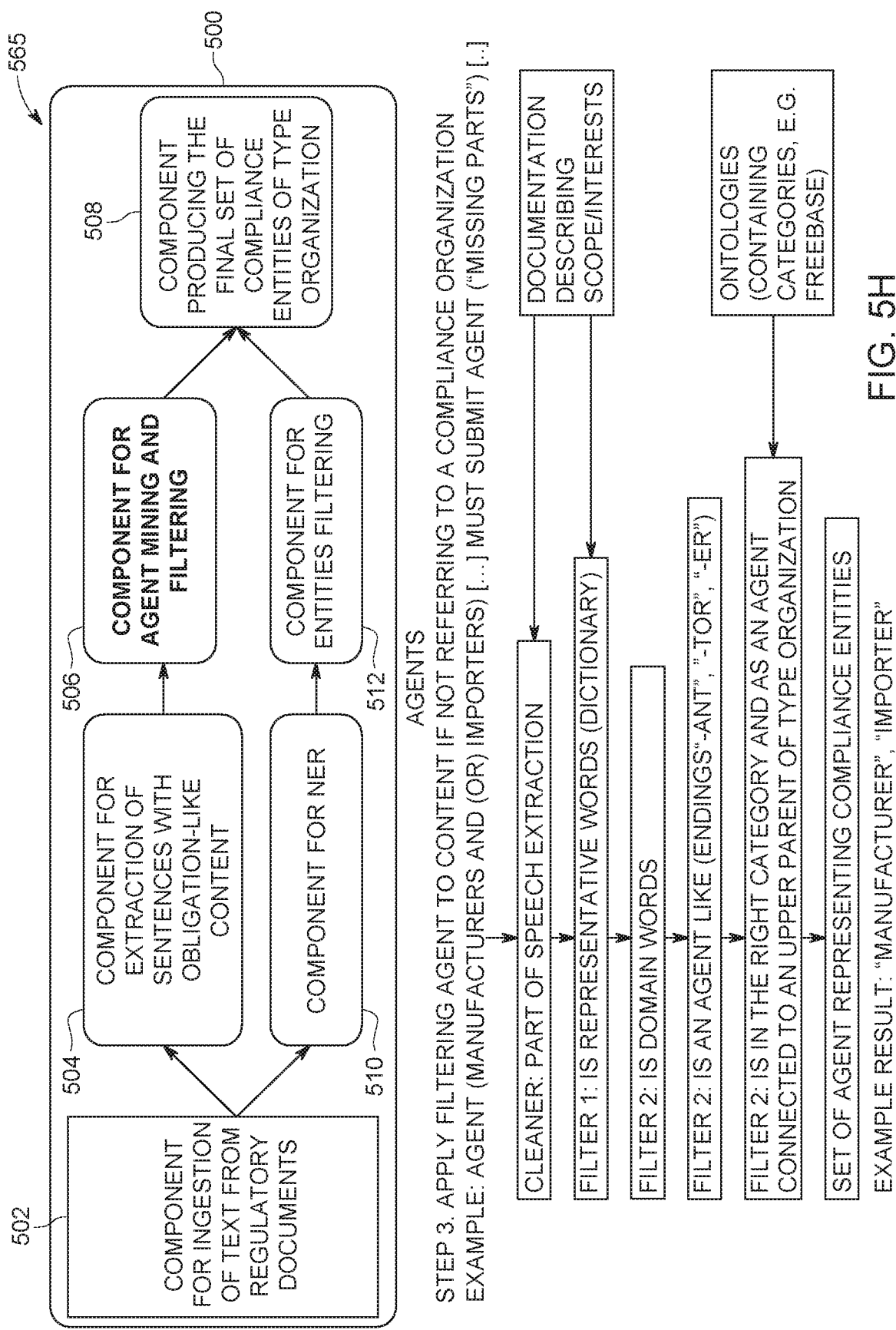
FIG. 5H is an additional flow diagram depicting agent mining and filtering according to an operation for automatic extraction of data of a compliance named entity of type organization in FIG. 5A in accordance with aspects of the present invention.

Step 3 may include applying a filtering agent to the content if the content does not refer to or relate to a compliance organization, as indicated in FIG. 5H. For example, FIG. 5H depicts a cleaning component (e.g., cleaning the agent text) to filter the parts of speech and filter based on representative words (using a dictionary) of documentation that describes a scope or interest of the agents. Filter 2 may filter domain words, agent like endings such as, for example, -ant, -tor, -er (e.g., manufacturer), an obligation or right or constraint category and as an agent connected to an upper parent of type organization (which may be from a knowledge domain or "ontology"). A set of agents representing one or more compliance named entities of type organization may be obtained (e.g., manufacturer or importer).

Figure 5I:
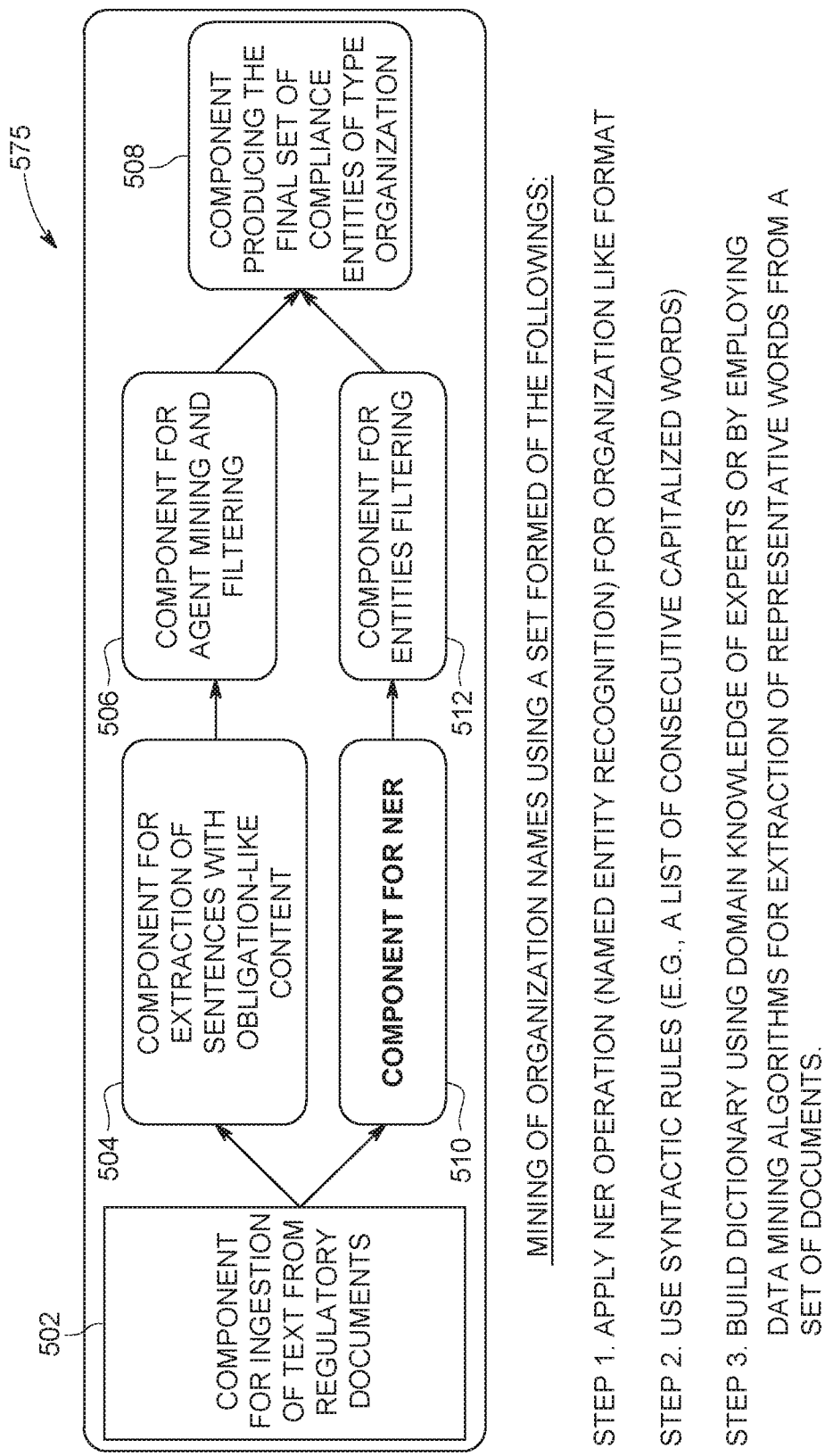
FIG. 5I is an additional flow diagram depicting a named entity of type organization recognition according to an operation for automatic extraction of data of a compliance named entity of type organization in FIG. 5A in accordance with aspects of the present invention.

Turning now to FIG. 5I, block diagram 575 depicts a named entity recognition (NER) operation according to block 510 in FIG. 5A. The NER operation may include mining of organization names according to steps 1-3. Step 1 includes applying the NER operation (NER in an NLP domain) for organization like format (e.g., NER tools extract an organization type). Step 2 includes using syntactic rules (e.g., a list of consecutive capitalized words). Step 3 includes building a dictionary using a domain knowledge of SME or by employing one or more data mining operations for extraction of representative text (e.g., words) from a set of data sources (e.g., documents).

Figure 5J:
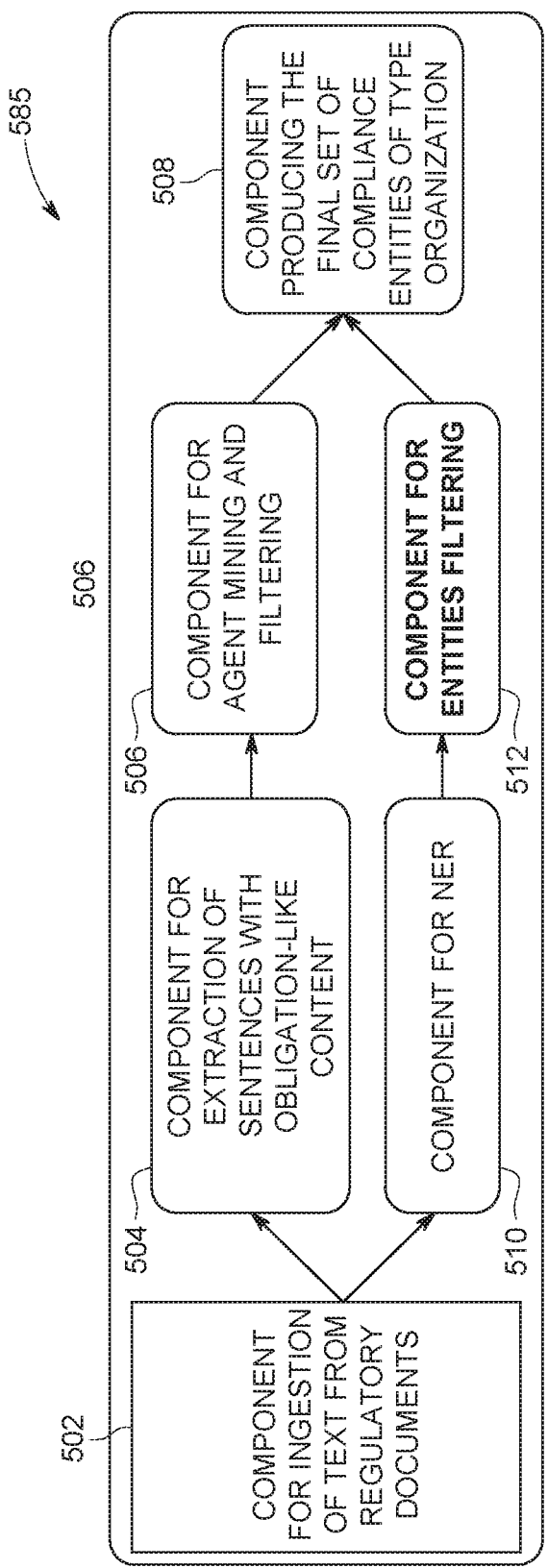
FIG. 5J is an additional flow diagram depicting entity filtering according to an operation for automatic extraction of data of a compliance named entity of type organization in FIG. 5A in accordance with aspects of the present invention.

Turning now to FIG. 5J, block diagram 585 depicts an entity filtering according to block 512 in FIG. 5A. In one aspect, the filtering (e.g., filter 1) may filter the compliance named entities of type organization based on quantitative filters such as, for example, the frequency in a data source, references of the data source, or in a cluster of similar data sources. The filtering (e.g., filter 2) may apply a filter based on a category (if in accordance with the one representative for the organization interests).

Figure 5K:
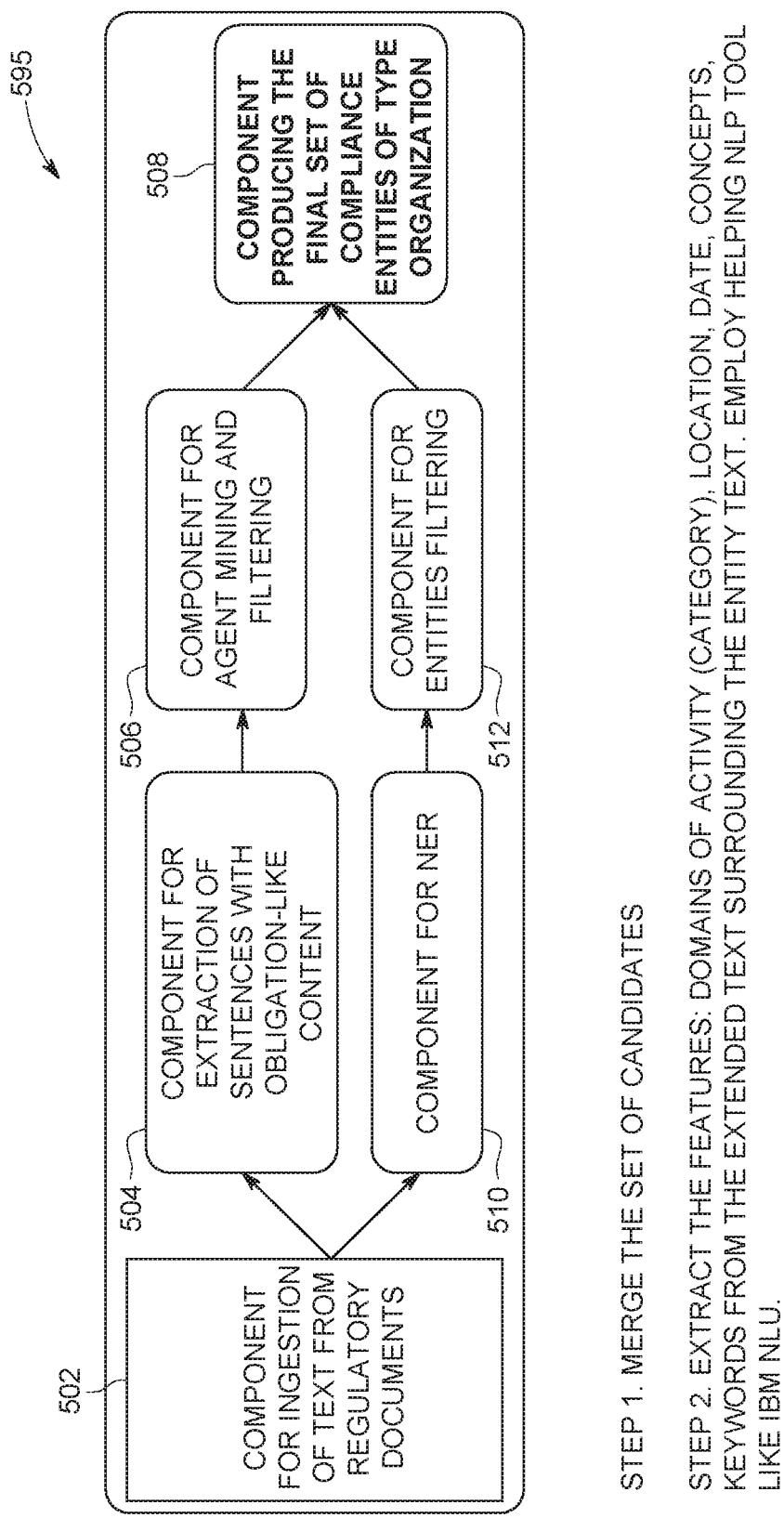
FIG. 5K is an additional flow diagram depicting producing a set of compliance named entities of type organization according to an operation for automatic extraction of data of a compliance named entity of type organization in FIG. 5A in accordance with aspects of the present invention.

Turning now to FIG. 5K, block diagram 595 depicts producing a set of compliance named entities of type organization according to block 508 in FIG. 5A. The generation of a final set of compliance named entities of type organization may be performed in three steps. Step 1 may include merging a set of candidates.

Step 2 may include extracting features such as, for example, domains of activity (e.g., a category), location, date, concepts, and keywords from the extended text surrounding the entity text. Step 3 may include training a ML classifier (if necessary) using the compliance entity of type organization text and a set of features of the compliance entity of type organization text and learning an appropriate model fitting the set of compliance named entities of type organization.

Figure 6:
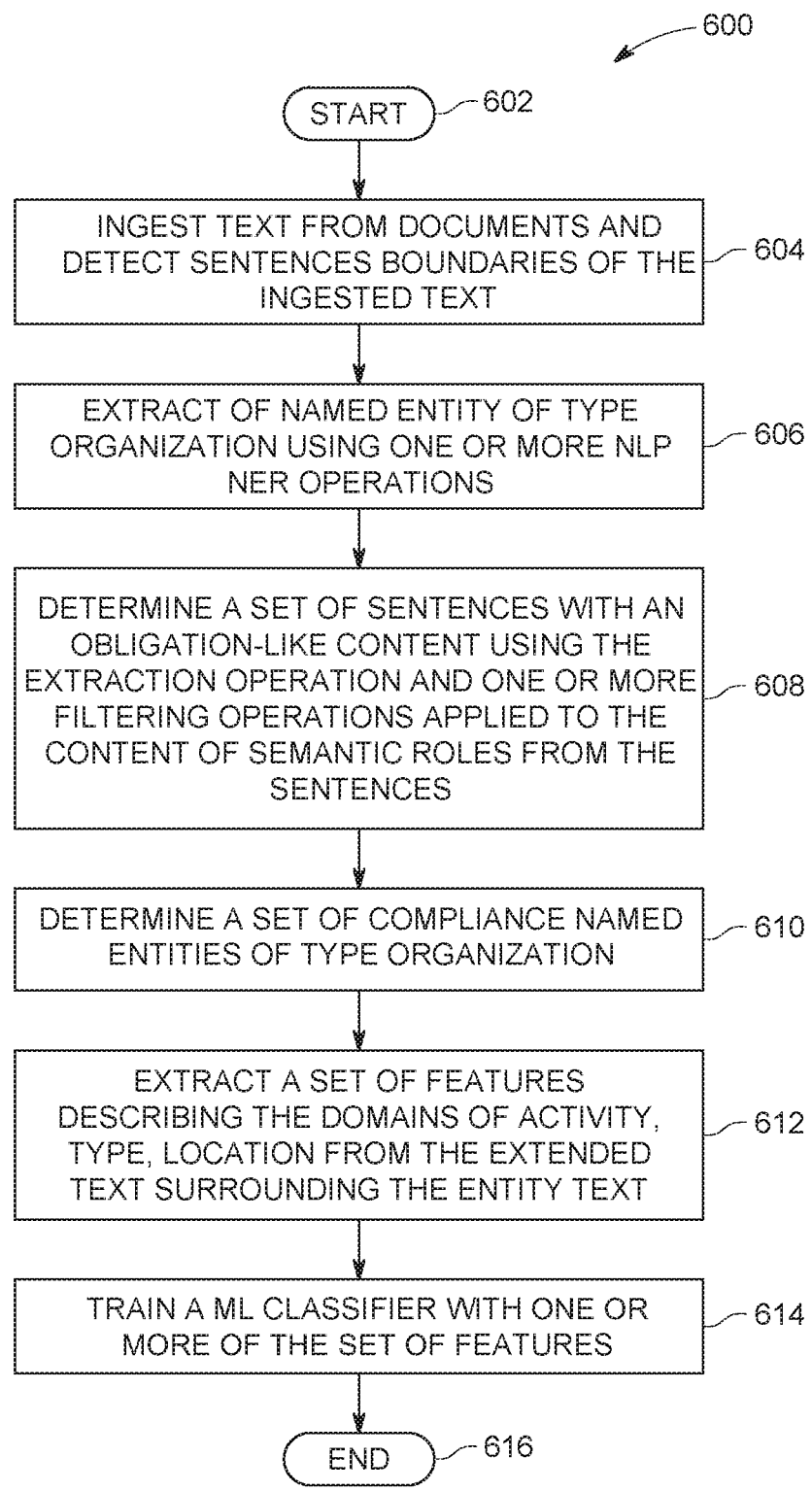
FIG. 6 is a flowchart diagram depicting an additional exemplary method for automatic extraction of data of a compliance named entity of type organization in which aspects of the present invention may be realized.

Turning now to FIG. 6, a method 600 for automatic extraction of data of a compliance named entity of type organization using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5A-5K may be implemented all and/or in part in FIG. 6.

The functionality 600 may start in block 602. Text data may be ingested from documents and sentence boundaries of the ingested text may be detected, as in block 604. A named entity of type organization may be extracted using one or more NLP NER operations, as in block 606. A set of sentences with an obligation-like content may be determined (e.g., computed) using the extraction operation and one or more filtering operations applied to the content of semantic roles from the sentences, as in block 608. A set of compliance named entities of type organization may be determined (e.g., computed), as in block 610. A set of features describing the domains of activity, type, and location from the extended text surrounding the entity text may be extracted, as in block 612. A machine learning (ML) classifier may be trained using one or more of the set of features, as in block 614. The functionality 600 may end, as in block 616.

Figure 7:
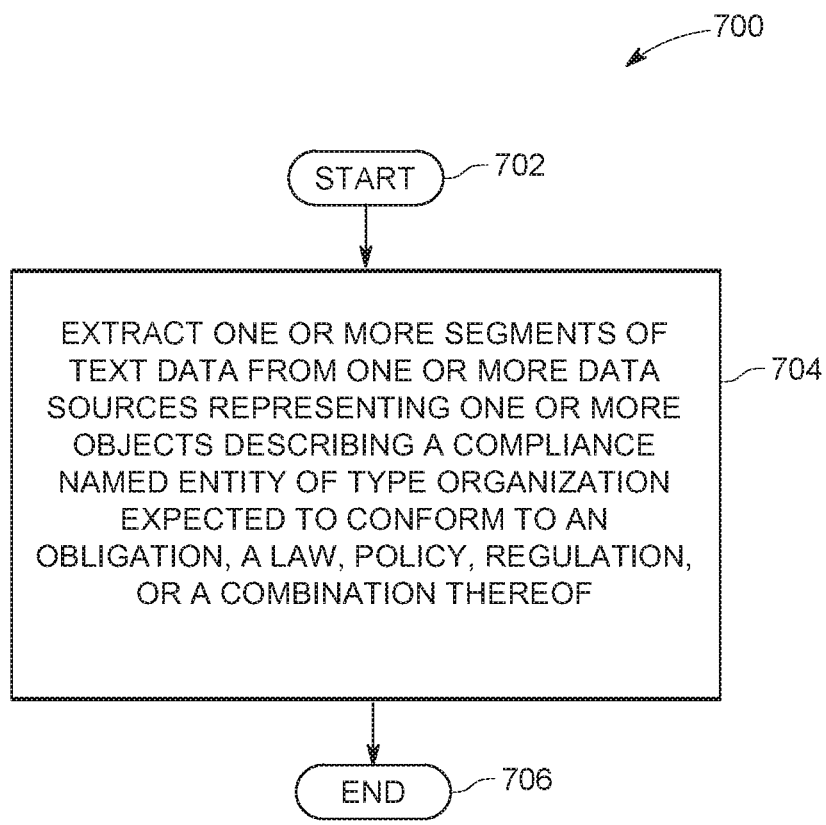
FIG. 7 is an additional flowchart diagram depicting an additional exemplary method for automatic extraction of data of a compliance named entity of type organization by a processor, again in which aspects of the present invention may be realized.

Turning now to FIG. 7, a method 700 for automatic extraction of data of a compliance named entity of type organization using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. In one aspect, the functionality, operations, and/or architectural designs of FIGS. 1-5A-5K may be implemented all and/or in part in FIG. 7.

The functionality 700 may start in block 702. One or more segments of text data may be extracted from one or more data sources representing one or more objects describing a compliance named entity of type organization expected to conform to an obligation, a law, policy, regulation, or a combination thereof, as in block 704. The functionality 700 may end, as in block 706.

In one aspect, in conjunction with and/or as part of at least one block of FIG. 7, the operations of 700 may include each of the following. The operations of 700 may include ingesting the text data from the one or more data sources upon processing the text data using a lexical analysis, parsing, extraction of concepts, semantic analysis, or a combination thereof. Boundaries of each of the one or more segments of the text data that are extracted may be detected.

The operations of 700 may extract the compliance named entity of type organization from the text data and determine a set of the one or more segments having similar obligations of the compliance named entity of type organization. NLP may be used to determine the one or more segments for identifying the obligation. NLP may be used to determine one or more features associated with the compliance named entity, wherein the one or more features include a domain of activity, a type of organization, location data, or combination thereof. A machine learning mechanism may be initialized to learn the one or more features associated with the compliance named entity.

The operations of 700 may define the compliance named entity of type organization as a named entity identifying an organization or an agent representing a group of organizations having similar types of activities, define the compliance named entity with one or more features, wherein the one or more features include a domain of activity, a type of organization, location data, or combination thereof, and define the obligation as a required action for compliance with a law, policy, regulation, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for automatic extraction of data of a compliance named entity of type organization in a computing environment, comprising:
    extracting one or more segments of text data from one or more data sources representing one or more features describing a compliance named entity of type organization expected to conform to an obligation, a law, policy, regulation, or a combination thereof, wherein extracting the one or more segments of text data includes filtering semantic content of the one or more data sources, inclusive of identifying predetermined suffixes of vocabulary of the semantic content indicative of words suggesting the vocabulary is in reference to agents of the compliance named entity of type organization, to identify the one or more segments of text data which relate to obligations of the agents, wherein the one or more features describing the compliance named entity are identified by performing a named-entity recognition (NER) operation on the text data as a subtask of the text data extraction;
    classifying specifically named entities into predefined categories, wherein the predefined categories represent one of the one or more features;
    associating the obligation with the compliance named entity based on the compliance named entity being in a similar one of the predefined categories, wherein the obligation, law, policy, regulation, or combination thereof is identified by locating obligatory language, identified among non-obligatory language in both regulatory and non-regulatory documents and determined by examining both direct and inferential content of the semantic content in the one or more segments of the text data, directed to an action specifically required by a referent of the NER operation;
    tagging the obligatory language within the text data respectively as suggested and mandated;
    training a machine learning classifier, using the one or more features from the extracted text data, to associate the obligation, law, policy, regulation, or combination thereof with the compliance named entity; and
    learning an appropriate machine learning model, according to the trained machine learning classifier, fitting the one or more features of the compliance named entity and constraints associated with the obligation, law, policy, regulation, or combination thereof to output a compliance profile of type organization for the compliance named entity, wherein the compliance profile of type includes implementing the trained machine learning classifier to automatically assign the obligation to a specific company comprising the compliance named entity.

2. The method of claim 1, further including ingesting the text data from the one or more data sources upon processing the text data using a lexical analysis, parsing, extraction of concepts, semantic analysis, or a combination thereof.

3. The method of claim 1, further including detecting boundaries of each of the one or more segments of the text data that are extracted.

4. The method of claim 1, further including using natural language processing (NLP) to determine the one or more segments with obligation content, wherein the one or more segments are sentences and the obligation content requires an obligation to conform to the obligation, the law, the policy, the regulation, or a combination thereof.

5. The method of claim 1, further including using natural language processing (NLP) to determine the one or more features associated with the compliance named entity of type organization, wherein the one or more features include a domain of activity, a type of organization, location data, or combination thereof.

6. The method of claim 1, further including initializing a machine learning mechanism to learn the one or more features associated with the compliance named entity of type organization.

7. The method of claim 1, further including:
    defining the compliance named entity of type organization as a named entity identifying an organization or an agent representing a group of organizations having similar types of activities;
    defining the compliance named entity with the one or more features, wherein the one or more features further include a domain of activity, a type of organization, location data, or combination thereof; and
    defining the obligation as the required action for compliance with the law, policy, regulation, or a combination thereof.

8. A system for automatic extraction of data of a compliance named entity of type organization, comprising:
one or more computers with executable instructions that when executed cause the system to:
extract one or more segments of text data from one or more data sources representing one or more features describing a compliance named entity of type organization expected to conform to an obligation, a law, policy, regulation, or a combination thereof, wherein extracting the one or more segments of text data includes filtering semantic content of the one or more data sources, inclusive of identifying predetermined suffixes of vocabulary of the semantic content indicative of words suggesting the vocabulary is in reference to agents of the compliance named entity of type organization, to identify the one or more segments of text data which relate to obligations of the agents, wherein the one or more features describing the compliance named entity are identified by performing a named-entity recognition (NER) operation on the text data as a subtask of the text data extraction;
classify specifically named entities into predefined categories, wherein the predefined categories represent one of the one or more features;
associate the obligation with the compliance named entity based on the compliance named entity being in a similar one of the predefined categories, wherein the obligation, law, policy, regulation, or combination thereof is identified by locating obligatory language, identified among non-obligatory language in both regulatory and non-regulatory documents and determined by examining both direct and inferential content of the semantic content in the one or more segments of the text data, directed to an action specifically required by a referent of the NER operation;
tag the obligatory language within the text data respectively as suggested and mandated;
train a machine learning classifier, using the one or more features from the extracted text data, to associate the obligation, law, policy, regulation, or combination thereof with the compliance named entity; and
learn an appropriate machine learning model, according to the trained machine learning classifier, fitting the one or more features of the compliance named entity and constraints associated with the obligation, law, policy, regulation, or combination thereof to output a compliance profile of type organization for the compliance named entity, wherein the compliance profile of type includes implementing the trained machine learning classifier to automatically assign the obligation to a specific company comprising the compliance named entity.

9. The system of claim 8, wherein the executable instructions ingest the text data from the one or more data sources upon processing the text data using a lexical analysis, parsing, extraction of concepts, semantic analysis, or a combination thereof.

10. The system of claim 8, wherein the executable instructions detect boundaries of each of the one or more segments of the text data that are extracted.

11. The system of claim 8, wherein the executable instructions use natural language processing (NLP) to determine the one or more segments with obligation content, wherein the one or more segments are sentences and the obligation content requires an obligation to conform to the obligation, the law, the policy, the regulation, or a combination thereof.

12. The system of claim 8, wherein the executable instructions use natural language processing (NLP) to determine the one or more features associated with the compliance named entity of type organization, wherein the one or more features further include a domain of activity, a type of organization, location data, or combination thereof.

13. The system of claim 8, wherein the executable instructions initialize a machine learning mechanism to learn the one or more features associated with the compliance named entity of type organization.

14. The system of claim 8, wherein the executable instructions:
define the compliance named entity of type organization as a named entity identifying an organization or an agent representing a group of organizations having similar types of activities;
define the compliance named entity with the one or more features, wherein the one or more features include a domain of activity, a type of organization, location data, or combination thereof; and
define the obligation as the required action for compliance with the law, policy, regulation, or a combination thereof.

15. A computer program product for, by a processor, automatic extraction of data of a compliance named entity of type organization, the computer program product comprising a non-transitory computer-readable storage medium having computer-readable program code portions stored therein, the computer-readable program code portions comprising:
an executable portion that extracts one or more segments of text data from one or more data sources representing one or more features describing a compliance named entity of type organization expected to conform to an obligation, a law, policy, regulation, or a combination thereof, wherein extracting the one or more segments of text data includes filtering semantic content of the one or more data sources, inclusive of identifying predetermined suffixes of vocabulary of the semantic content indicative of words suggesting the vocabulary is in reference to agents of the compliance named entity of type organization, to identify the one or more segments of text data which relate to obligations of the agents, wherein the one or more features describing the compliance named entity are identified by performing a named-entity recognition (NER) operation on the text data as a subtask of the text data extraction;
an executable portion that classifies specifically named entities into predefined categories, wherein the predefined categories represent one of the one or more features;
an executable portion that associates the obligation with the compliance named entity based on the compliance named entity being in a similar one of the predefined categories, wherein the obligation, law, policy, regulation, or combination thereof is identified by locating obligatory language, identified among non-obligatory language in both regulatory and non-regulatory documents and determined by examining both direct and inferential content of the semantic content in the one or more segments of the text data, directed to an action specifically required by a referent of the NER operation;

an executable portion that tags the obligatory language within the text data respectively as suggested and mandated;

an executable portion that trains a machine learning classifier, using the one or more features from the extracted text data, to associate the obligation, law, policy, regulation, or combination thereof with the compliance named entity; and an executable portion that learns an appropriate machine learning model, according to the trained machine learning classifier, fitting the one or more features of the compliance named entity and constraints associated with the obligation, law, policy, regulation, or combination thereof to output a compliance profile of type organization for the compliance named entity, wherein the compliance profile of type includes implementing the trained machine learning classifier to automatically assign the obligation to a specific company comprising the compliance named entity.

16. The computer program product of claim 15, further including an executable portion that ingests the text data from the one or more data sources upon processing the text data using a lexical analysis, parsing, extraction of concepts, semantic analysis, or a combination thereof.

17. The computer program product of claim 15, further including an executable portion that detects boundaries of each of the one or more segments of the text data that are extracted.

18. The computer program product of claim 15, further including an executable portion that uses natural language processing (NLP) to determine the one or more segments with obligation content, wherein the one or more segments are sentences and the obligation content requires an obligation to conform to the obligation, the law, the policy, the regulation, or a combination thereof.

19. The computer program product of claim 15, further including an executable portion that:
   uses NLP to determine the one or more features associated with the compliance named entity of type organization, wherein the one or more features include a domain of activity, a type of organization, location data, or combination thereof; and
   initializes a machine learning mechanism to learn the one or more features associated with the compliance named entity of type organization.

20. The computer program product of claim 15, further including an executable portion that:
   defines the compliance named entity of type organization as a named entity identifying an organization or an agent representing a group of organizations having similar types of activities;
   defines the compliance named entity with one or more features, wherein the one or more features further include a domain of activity, a type of organization, location data, or combination thereof; and
   defines the obligation as the required action for compliance with the law, policy, regulation, or a combination thereof.

* * * * *